(12) United States Patent
Schliemann et al.

(10) Patent No.: US 6,539,908 B2
(45) Date of Patent: Apr. 1, 2003

(54) INLET CONDUIT FOR A VALVE-CONTROLLED INTERNAL COMBUSTION ENGINE AND METHOD OF PRODUCING A FLOW DEFLECTION EDGE IN AN INLET CONDUIT

(75) Inventors: Harald Schliemann, Waiblingen (DE); Manfred Rabis, Schorndorf (DE); Imke Bruhns, Fellbach (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/944,772

(22) Filed: Aug. 31, 2001

(65) Prior Publication Data

US 2002/0026919 A1 Mar. 7, 2002

(30) Foreign Application Priority Data

Sep. 2, 2000 (DE) .......................... 100 43 233
Oct. 23, 2000 (DE) .......................... 100 52 470

(51) Int. Cl.$^7$ ................................. F02N 3/00
(52) U.S. Cl. ................................. 123/188.14
(58) Field of Search .................. 123/188.14, 193.5, 123/306, 308; 29/888.06

(56) References Cited

U.S. PATENT DOCUMENTS

5,595,156 A * 1/1997 Tsuzuku ................ 123/306

FOREIGN PATENT DOCUMENTS

DE 3417526 A1 5/1985

* cited by examiner

Primary Examiner—John Kwon
Assistant Examiner—Hyder Ali
(74) Attorney, Agent, or Firm—R W Becker & Associates; R W Becker

(57) ABSTRACT

An inlet conduit is provided for a valve-controlled internal combustion engine, and also provided is a method for producing a flow deflection edge in an inlet conduit. In the region where the supply passage portion and the valve end passage portion of the inlet conduit meet, a cylindrical rod is guided through the cylinder head of the internal combustion engine. Portions of the peripheral surface of the rod form portions of the passage wall of the inlet conduit.

8 Claims, 1 Drawing Sheet

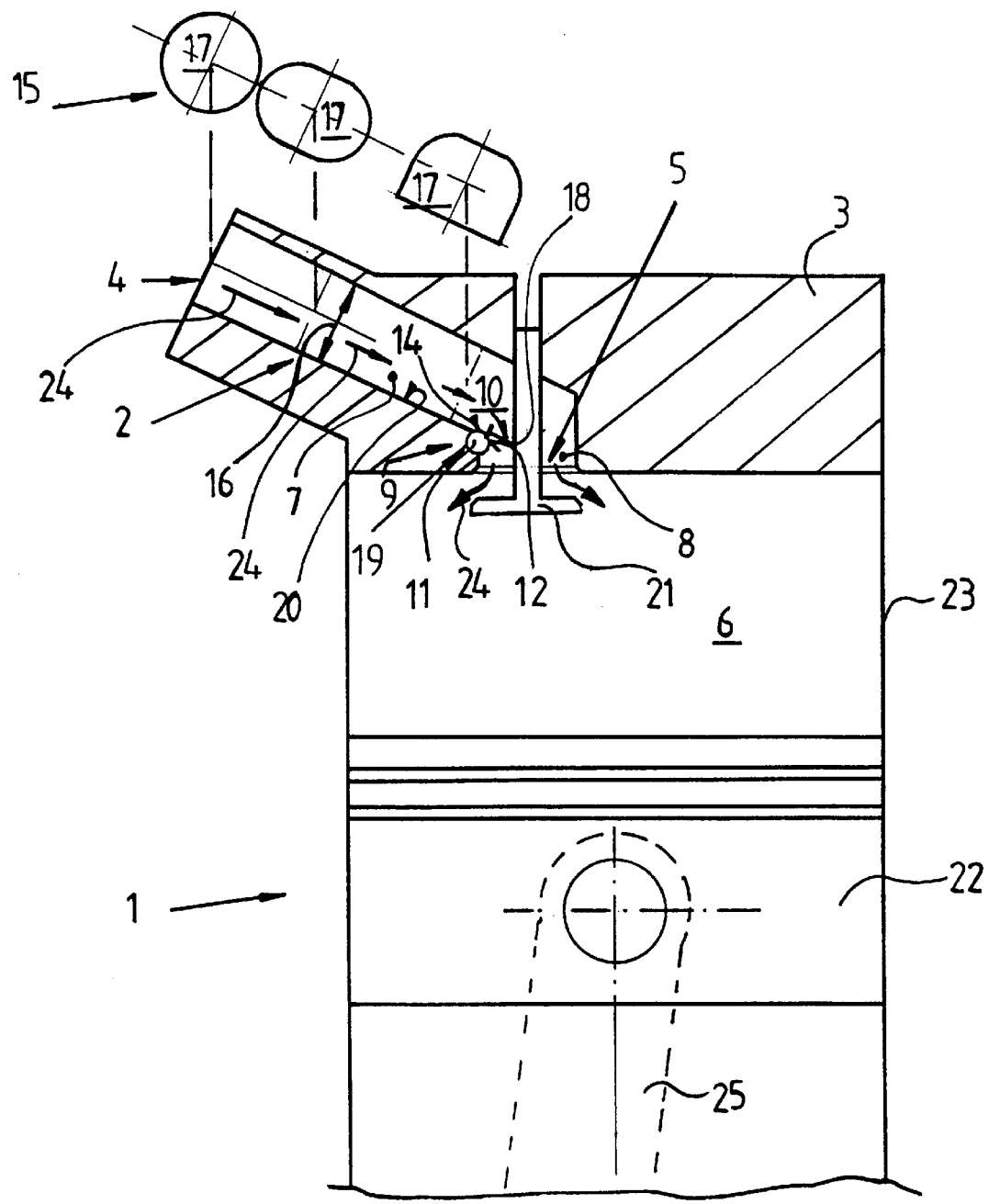

INLET CONDUIT FOR A VALVE-CONTROLLED INTERNAL COMBUSTION ENGINE AND METHOD OF PRODUCING A FLOW DEFLECTION EDGE IN AN INLET CONDUIT

BACKGROUND OF THE INVENTION

The present invention relates to an inlet conduit for a valve-controlled internal combustion engine, especially for a manually guided implement. The present invention also relates to a method of producing a flow deflection edge in such an inlet conduit.

DE 34 17 526 discloses a valve-controlled internal combustion engine, the inlet conduit of which is essentially formed in a cylinder head of the internal combustion engine and is provided with an outer inlet opening as well as an inner, valve-controlled inlet into a combustion chamber. The inlet conduit is formed from a supply passage portion and a valve end passage portion that opens into the combustion chamber of the internal combustion engine. The two passage portions are complicated and complex spherically shaped passages in order to provide favorable flow conditions in the inlet conduit. In order to be able to mass produce cylinder heads having such conduits, slide-in units are used that in order to form the conduits are introduced into the mold prior to the casting and after the casting are again withdrawn. In regions of overlap, the slide-in units rest against one another, as a result of which sharp edges are formed that must later be finished in a complicated and/or expensive procedure.

It is therefore an object of the present invention to provide an inlet conduit for a valve-controlled internal combustion engine with which, along with a straightforward manufacture, a high degree of filling of the combustion chamber of the internal combustion engine is made possible. A further object of the present invention is to provide a method for producing a flow deflection edge in such an inlet conduit.

BRIEF DESCRIPTIONS OF THE DRAWING

These and other objects and advantages of the present invention will appear more clearly from the following specification in conjunction with the accompanying schematic drawing, the sole FIGURE of which is a cross-sectional view through one exemplary embodiment of an inventive inlet conduit.

SUMMARY OF THE INVENTION

The inlet conduit of the present invention essentially extends in a cylinder head of the internal combustion engine and is provided with an outer inlet opening and an inner valve-controlled inlet into the combustion chamber of the engine, wherein the inlet conduit comprises a supply passage portion and a valve end passage portion that adjoins the supply passage portion at an angle, wherein the inlet conduit is further provided with a channel in the region of where the passage portions meet, and wherein a preferably cylindrical rod is disposed in the channel and portions of the peripheral surface of the rod form portions of the passage wall of the inlet conduit.

The method of the present invention makes it possible to produce the inlet conduit in a straightforward manner. Such method includes the steps of introducing, into the cylinder head of the internal combustion engine, tangential to the passage wall of the inlet conduit, a bore that removes an intersection of the supply passage portion and the valve end passage portion to thereby form a channel in the region where the passage portions meet, and subsequently inserting a rod into the channel such that portions of the peripheral surface of the rod form portions of the passage wall of the inlet conduit.

To achieve a high degree of filling of the combustion chamber of an internal combustion engine, flow conditions of the air or of the air/fuel mixture in the inlet conduit of the internal combustion engine should be as laminar as possible. The flow conditions are positively affected by providing rounded channel transitions in the region where the supply passage portion and the valve end passage portion of the inlet conduit meet. If such region of intersection of the inlet conduit is compared with a human knee, the supply passage portion represents the thigh and the valve passage portion represents the shin. Pursuant to the present invention, a simple way for providing an inner, rounded channel is provided. This is accomplished by introducing a cylindrical rod through the cylinder head in the region of the channel, so that portions of the periphery of the rod form a wall portion of the inlet conduit.

It is expedient to allow portions of the periphery of the rod to project beyond the contour of the inlet conduit. As a consequence of this structural measure, flow over the rod is provided and at least a turbulent renewed contact of the flow after flowing over the rod is effected.

So that the rod can form a wall portion of the inlet conduit over the entire width of the channel thereof, the cross-sectional area of the inlet conduit in the region of the channel is advantageously markedly oval shaped to D-shaped. With such a cross-sectional area, the rod forms the approximately linearly extending leg of the oval or D. To form such a cross-sectional area, it is provided pursuant to the present invention that the cross-section of the supply passage portion transitions, and in particular in a continuous manner, from a nearly round shape to an oval shape to the aforementioned D-shape in the region where the two passage portions meet. The height of the supply passage portion preferably decreases from the inlet opening to the region of intersection of the passage portions. In order to be able to withdraw the slide-in unit that is introduced during casting, the cross-sectional area is appropriately configured, and decreases in a direction toward the region where the passage portions meet.

The rod is preferably held with press fit in the cylinder head.

Pursuant to the inventive method for producing such an inlet conduit, the supply passage portion and the valve end passage portion are produced in the cylinder head by a known casting technique using cores or slide-in units that are to be extracted. To obtain a round edge in the channel in the region where the passage portions meet, a bore is introduced into the cylinder head in this region, tangential to the passage wall; the bore intersects the cross-section of not only the valve end passage portion but also of the passage portion on the in-flow side. A cylindrical pin or rod is to be inserted into this intersecting bore. Portions of the wall or peripheral surface of the rod thus form portions of the passage wall of the inlet conduit, with air or fuel/air mixture flowing thereabout during operation of the internal combustion engine. In contrast to the sharp edge that is normally produced during the manufacture of an inlet conduit, a rounded flow deflection edge is formed by the inventive rod without a complicated or expensive machining process being required in the region of the channel. The radius of curvature of the flow deflection edge can be selected over a wide range as a function of the diameter of the rod.

Further specific features of the present invention will be described in detail subsequently.

DESCRIPTION OF THE PREFERRED EMBODIMENTS

Referring now to the drawing in detail, the sole FIGURE shows a schematic longitudinal cross-section through an inlet conduit 2 of a valve-controlled internal combustion engine 1 that is provided with a cylinder 23. The internal combustion engine 1 is preferably utilized in a manually guided implement.

Disposed in the cylinder 23 of the internal combustion engine 1 is a reciprocating piston 22 that drives a non-illustrated crankshaft via a connecting rod 25. The combustion chamber 6 of the internal combustion engine 1 is delimited by the piston 22, the cylinder 23 and a cylinder head 3.

The inlet conduit 2 extends essentially in the cylinder head 3 and is provided with an outer inlet opening 4. Air for combustion 24, or a fuel/air mixture, enters the inlet opening 4. At that end of the inlet conduit 2 that is disposed opposite the inlet opening 4, the inlet conduit opens into the combustion chamber 6 of the internal combustion engine 1 via an inner inlet 5 that is controlled by an intake valve 21. The inlet conduit 2 is formed from a supply passage portion 7 and a valve end passage portion 8 that adjoins the portion 7 at an angle. If one were to compare the cross-section through the inlet conduit 2 with a human knee, then the supply passage portion 7 is the thigh, and the valve end passage portion 8 is the shin. In the region 10 where the passage portions 7 and 8 meet, an inner channel 9 is formed. In order in a simple manner to effect an approximately laminar flow about the flow deflection edge 18 that is formed at the channel 9, it is provided pursuant to the present invention to replace the deflection edge 18 with an in particular cylindrical pin or rod 11; in the region of the channel 9, the rod 11 is preferably inserted into the cylinder head 3 from the outside. Portions 12 of the peripheral surface of the rod 11 form a portion 14 of the passage wall 20 of the inlet conduit 2.

It is expedient to dispose the rod 11 in the cylinder head 3 such that it projects out of the contour of the inlet conduit 2. This ensures at least a turbulent flow about the flow deflection edge 18 that is formed by the rod 11, with renewed contact of the flow against the passage wall of the valve end passage portion 8. This effects a greater degree of filling of the combustion chamber 6 of the internal combustion engine 1.

The shape of the cross-sectional area 15 of the supply passage portion 7 preferably varies over the length of the portion 7. As shown in the upper left hand portion of the figure, the cross-sectional area 15 at the inlet opening 4 has a nearly circular configuration, and changes approximately in the middle of the passage portion 7 to an oval cross-sectional configuration. In the region 10 where the passage portions 7 and 8 meet, and in particular in the channel 9, the cross-sectional area 15 of the supply passage portion 7 has a marked oval or D-shape. With this cross-sectional shape of the passage portion 7, the rod 11 forms the approximately linear leg of the oval or D. The transitions between the cross-sectional shapes are expediently continuous without the formation of any edges.

Starting from the inlet opening 4, the height 16 of the supply passage portion 7 decreases in the direction toward the region 10 where the passage portions meet. Again starting from the inlet opening 4, the cross-sectional area 17 of the supply passage portion 7 is embodied in a decreasing manner in a direction toward the region 10, in order to thereby ensure an extraction of the core after the casting. A more favorable flow about the flow deflection edge 18 is achieved by virtue of the subsequently inserted rod 11. The arrows 24 shown in the drawing indicate approximately the flow.

It is expedient to hold the rod 11 in the cylinder head 3 with a press fit.

To produce the flow deflection edge 18 in the region of the channel 9, after the casting the bore 19 is introduced into the cylinder head 3 tangential to the passage wall 20; the bore 19 intersects not only the passage portion 7 on the inlet side but also the valve end passage portion 8. The diameter of the bore is such that the intersection edge is bored out in the region of the channel 9. The rod 11 is pressed into the bore 19. Wall or peripheral portions 12 of the rod 11 thus form wall portions 14 of the inlet conduit 2.

The specification incorporates by reference the disclosure of German priority document 100 43 233.6 filed Sep. 2, 2000 and German priority document 100 52 470.2 filed Oct. 23, 2000.

The present invention is, of course, in no way restricted to the specific disclosure of the specification and drawing, but also encompasses any modifications within the scope of the appended claims.

We claim:

1. In an inlet conduit for a valve-controlled internal combustion engine, wherein said inlet conduit essentially extends in a cylinder head of said internal combustion engine and is provided with an outer inlet opening and an inner valve-controlled inlet into a combustion chamber of said internal combustion engine, and wherein said inlet conduit comprises a supply passage portion and a valve end passage portion that adjoins said supply passage portion at an angle, the improvement wherein:

said inlet conduit is provided, in the region where said supply passage portion and said valve end passage portion meet, with a channel;

wherein a cylindrical rod is disposed in said channel;

wherein portions of a peripheral surface of said rod form portions of a passage wall of said inlet conduit; and wherein said portions of the passage wall form a rounded flow deflection edge.

2. An inlet conduit according claim 1, wherein said portions of said peripheral surface of said rod project beyond a contour of at least one of said supply passage portion and said valve end portion.

3. An inlet conduit according to claim 2, wherein a cross-sectional area of said supply passage portion changes from a nearly circular shape at said inlet opening to an oval shape and subsequently to a D-shape in said region where said passage portions meet.

4. An inlet conduit according to claim 1, wherein a height of said supply passage portion decreases in a direction toward said region where said passage portions meet.

5. An inlet conduit according to claim 1, wherein a cross-sectional area of said supply passage portion decreases in a direction toward said region where said passage portions meet.

6. An inlet conduit according to claim 1, wherein said rod is held in said cylinder head with a press fit.

7. A method of producing a flow detection edge in an inlet conduit of an internal combustion engine, wherein said inlet conduit is formed of passage portions disposed at an angle to one another, said method including the steps of:

introducing, into a cylinder head of said internal combustion engine, tangential to a passage wall of said inlet conduit, a bore that removes an intersection of said passage portions to thereby form a channel in the region where said passage portions meet; and inserting a rod into said channel such that portions of a peripheral surface of said rod form portions of said passage wall of said inlet conduit.

8. A method according to claim 7, wherein said rod is a cylindrical rod.

* * * * *